Feb. 6, 1968 K. LE GROS ET AL 3,367,591

TAPE TRANSPORT MECHANISM FOR ANNOUNCEMENT/RECORDER MACHINES

Filed May 25, 1966 4 Sheets-Sheet 1

INVENTOR.
JOSEPH J. ZIMMERMAN
KENNETH LE GROS

BY James T. Whitesel
AGENT

INVENTOR.
JOSEPH J. ZIMMERMAN
KENNETH LE GROS
BY
James T. Whitesel
AGENT

TAPE TRANSPORT MECHANISM FOR ANNOUNCEMENT/RECORDER MACHINES

Filed May 25, 1966

INVENTOR.
JOSEPH J. ZIMMERMAN
KENNETH LE GROS
BY
James T. Whitesel
AGENT

INVENTOR.
JOSEPH J. ZIMMERMAN
KENNETH LE GROS
BY
James S. Whitsel
AGENT

United States Patent Office 3,367,591
Patented Feb. 6, 1968

3,367,591
TAPE TRANSPORT MECHANISM FOR ANNOUNCEMENT/RECORDER MACHINES

Kenneth LeGros, West Allis, and Joseph J. Zimmermann, Elm Grove, Wis., assignors to Automatic Electric Laboratories, Inc., Northlake, Ill., a corporation of Delaware Filed May 25, 1966, Ser. No. 552,749
9 Claims. (Cl. 242—55.12)

This invention relates generally to magnetic recording devices, and more particularly to announcement, or recorder, transport mechanisms adapted for use in connection with telephone answering machines or any type of machine requiring the use of a message repeater, wherein variable length messages are stored.

Heretofore, telephone answering or message repeating machines have taken various forms with an accordant variety of tape transport mechanisms. Among the types of transport mechanisms known to applicants are those disclosed in Patent 2,761,899, issued Sept. 4, 1956, to C. R. Keith et al.; Patent 2,854,512, issued Sept. 30, 1958, to J. J. Zimmermann; and Patent 2,928,898, issued Mar. 15, 1960, to E. R. Salzburg et al.; being commonly referred to as the Drum, Disc and Endless Magnetic Loop types, respectively. While the prior devices provided recording or announcement service as required, they used a combination of complex, delicate and awkward apparatus and were expensive to manufacture. As a result, there has been a reluctance to accept these devices for general daily public use because of high initial cost, service and maintenance problems and unwieldiness in operation.

As applied to telephone answering or message repeating machines, the primary object of the present invention is to provide an improved, simple, reliable and economical tape transport mechanism for use in announcement, or recorder, apparatus.

In the achievement of the above object, there is provided in a preferred embodiment of the invention, a tape transport mechanism including a unitary tape storage reel having at least two adjacently positioned tape storage grooves formed in the peripheral circumference thereof; with one end of a length of tape secured within the reel and a majority of the tape length stored in one of the grooves, while the remainder of the tape extends out over a loop into the mechanism and back via the other groove, with the other end also being secured within the reel. A compensating arrangement is provided for exerting pressure against the tape in the loop to take up tape slack therein, which is caused by the changing differences in diameters due to the tape buildup in the storage grooves as the tape is moved from one groove and stored in the other during operation of the machine. With this arrangement, uniform tape-to-head pressure is maintained, spillage of tape from the storage grooves is prevented and the necessity of takeup motors and slipping belts, or other devices, normally required in reel-to-reel announcement or recorder mechanisms to compensate for the varying speeds of two-reel arrangements, is eliminated. A series of belt driven speed-reducing pulleys are driven by the capstan drive motor for turning the capstan shaft, which cooperates with the pressure roller, to pull the tape in the normal direction and speed. An arrangement for reversing the direction of tape movement and rewinding it at high speed is provided for resetting the mechanism to the normal start position, wherein the drive motor is mounted on a pivotal platform (controlled by a reset solenoid) and camming the motion of the platform to a pivotal arm for controlling the position of the pressure roller to coact with the capstan, which is driven by the speed reduction system from the drive motor, whereby the capstan no longer pulls the tape in the normal direction and the shaft of the drive motor engages a rubber tire embedded in a third groove formed in the circumference of the storage reel to drive the reel at high speed in a reverse direction. When the tape is fully wound on either one storage groove or the other, a transparent leader, or section, at the corresponding tape end allows light to pass through and operate one or the other of a pair of light cells to stop further operation of the mechanism and movement of the tape in the respective direction, whereby tape breakage due to overrun is prevented. One of the transparent sections may be used to provide an automatic rewind function, as will be described in more detail hereinafter.

A modification of the above-described preferred embodiment features a tape transport mechanism including the unitary tape storage reel, the two-ended length of tape, the compensating arrangement, the speed reduction system controlled by the drive motor and the provision of a hand-operated indexing knob, which is mechanically engaged (in response to a manual operation thereof) with the tape storage reel through a geared up transmission to directly drive the reel in either a fast rewind or a fast forward direction to correspondingly index the tape, either back to the start position or forward to a desired position in a matter of seconds. A switch is operated in response to each initial movement of the indexing knob for completing an energizing circuit to the reset solenoid, which operates to disable the normal capstan tape drive during the remainder of operation of the knob.

The nature of the invention and its distinguishing features and advantages, which reside in the construction and arrangement and combination of parts, will be more clearly understood from the following detailed description when taken in conjunction with the accompanying drawings, wherein.

*Structural description*

Figure 1:
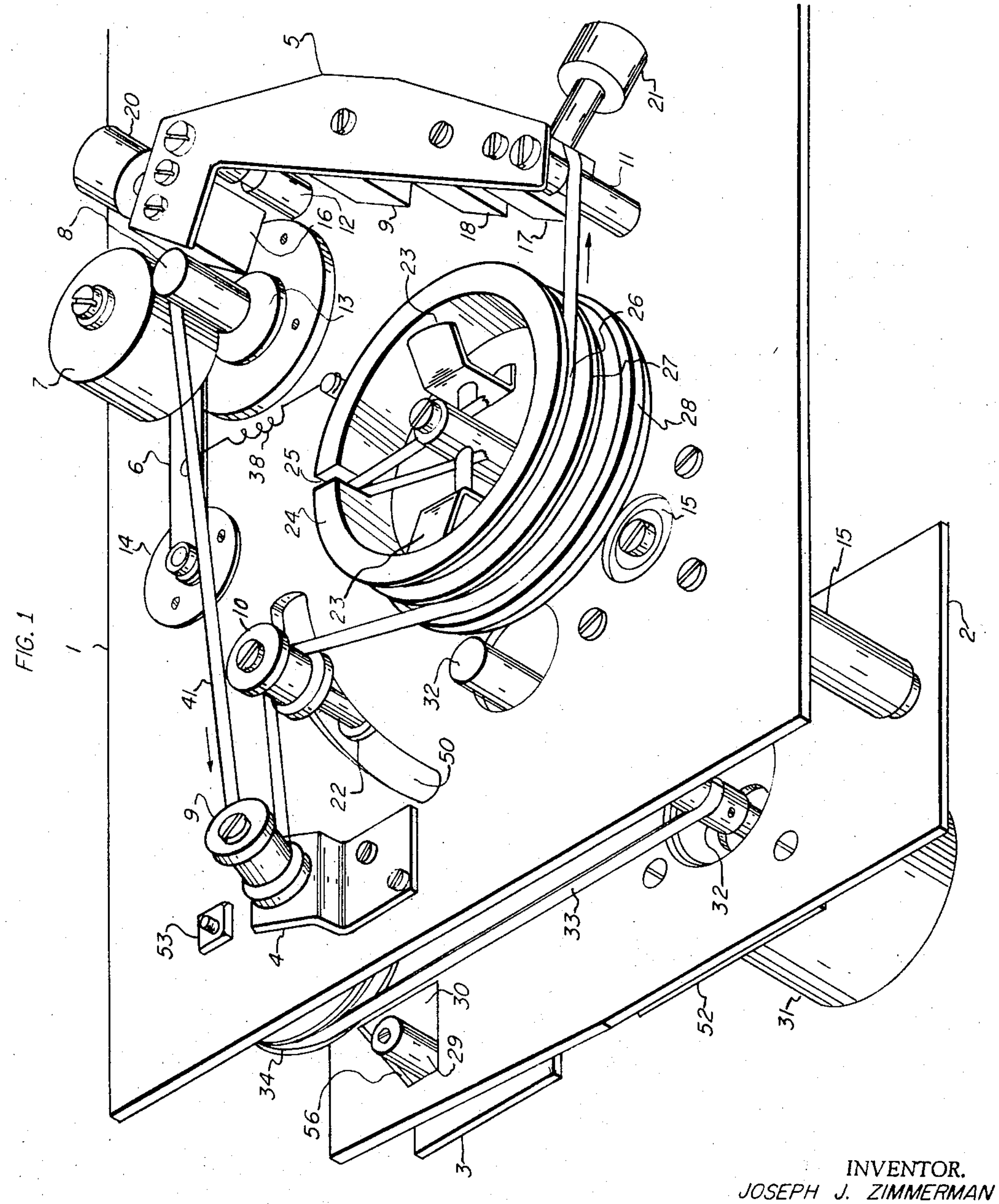
FIG. 1 is a partial perspective view of the announcement, or recorder, tape transport mechanism showing the unitary tape storage reel and the compensating arrangement for taking up slack in the tape.
Figure 2:
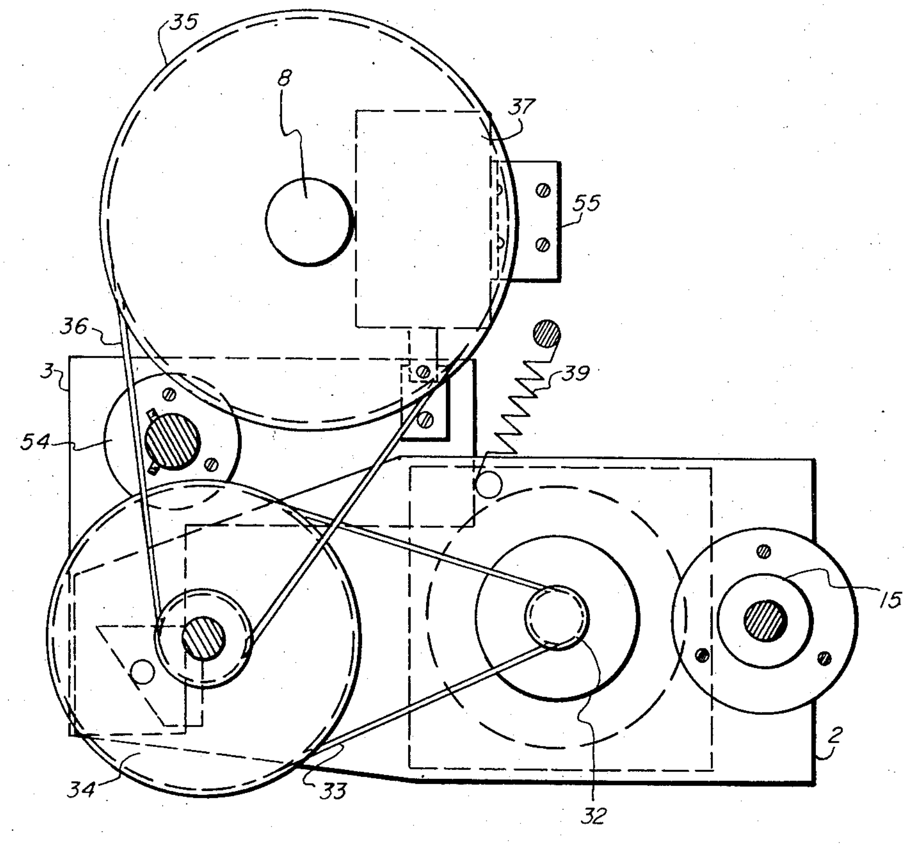
FIG. 2 is a view which shows the lower section of the tape transport mechanism as viewed looking downward from the top, with the main mounting plate and the upper section mounted on top of the plate removed.
Figure 3:
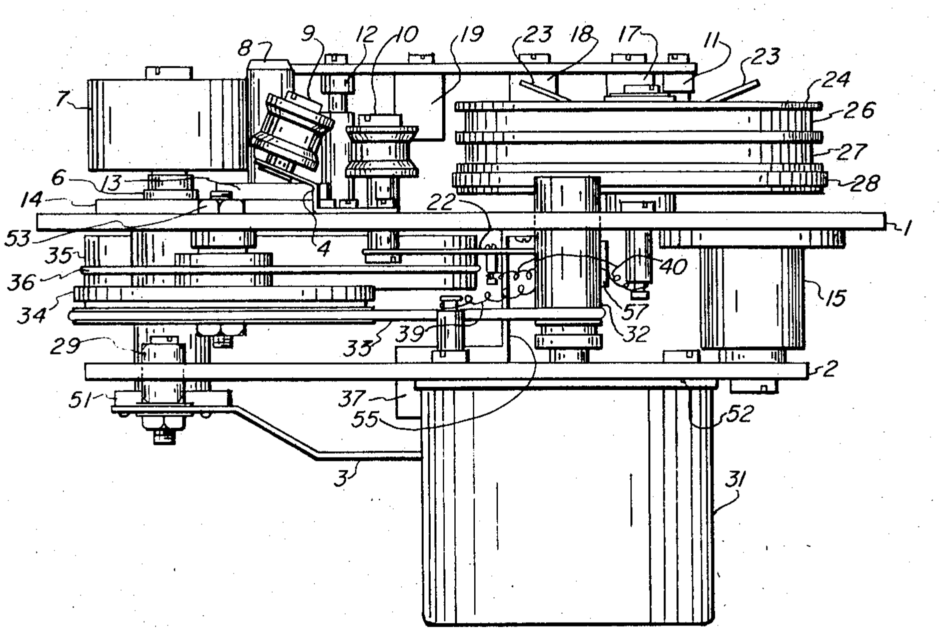
FIG. 3 is an elevation end view of the tape transport mechanism, as viewed from the left-hand end in FIG. 1.

A detailed description of the structure of the invention in its preferred form will now be given, reference being had with FIGS. 1 through 4, inclusive. The announcement, or recorder, tape transport mechanism may be described as consisting of an upper section and a lower section mounted on the top and bottom surfaces, respectively, of a main mounting frame, or support, 1.

Specifically, the upper section includes a unitary tape storage reel 24 rotatably mounted on frame 1. Storage reel 24 is constructed along the lines of a flat-bottomed cup and has a pair of adjacently positioned tape storage grooves 26 and 27 provided in its circumference. Storage grooves 26 and 27 correspond to the normal supply and takeup reels, respectively, of two-reel type machines. A rubber tire 28 is embedded in a third groove located directly below takeup groove 27 for a subsequently-described direct drive control of reel 24 by drive motor 31. A vertical slot 25 is provided in the outer edge of reel 24 and extends in a vertical direction equal to the combined widths of grooves 26 and 27 for allowing one end of tape 41 to extend from one of the tape grooves into the center of reel 24 and be frictionally held against the outer surface of the hub of reel 24 by one of the spring brackets 23 and further allow the other end of tape 41 to extend inward from the other tape groove and be held against the hub of reel 24 in the same manner by the other spring bracket 23. A hole is provided in frame 1 immediately to the left of reel 24, to accommodate drive pulley 32, which is attached to the drive shaft of drive motor 31. An arcuate shaped slot 50 is also provided in frame 1 further to the left of reel 24 to allow for arcuate movement of tension arm roller 10, which is mounted on a shaft attached to the end of the pivotally mounted tape tension arm 22. Angle bracket 4 is mounted on frame 1 to the left of slot 50, with angle roller 9 rotatably attached thereto to serve as a guide for tape 41. Pivot bearing 14 is positioned in frame 1 to the right and above angle roller 9 to provide a pivot point for a shaft positioned therein, having one end of pressure roller arm 6 rigidly attached thereto, with pressure roller 7 rotatably mounted on the other end of arm 6. Pressure roller arm 6 is biased in a clockwise direction by means of spring 38. Bearing 13 is positioned in frame 1 beneath and slightly to the right of pressure roller 7 to serve as a rotatable mounting for capstan shaft 8. It will be noted that the biasing action of spring 38 normally maintains pressure roller 7 in frictional engagement with capstan 8. Tape guide pillars 11 and 12 are mounted to frame 1 above and to the right of reel 24 and bearing 13 respectively, with mounting plate 5 being attached to the top of these pillars. Photocell 16, record/play head 19, erase head 18 and photocell 17, in sequencec from left-to-right, are mounted to the underneath side of mounting plate 5. Lamp holders 20 and 21, with their associated lamps, are mounted directly opposite photocells 16 and 17 respectively. Tape 41 follows a path in the machine extending from one end, which is held against the hub of reel 24 by one of the spring brackets 23, through slot 25 and into take-up groove 27, tension arm roller 10, angle bracket roller 9, between pressure roller 7 and capstan 8, across photocell 16, the outside portion of the tape groove in tape pillar 12, across the record/play head 19 and erase head 18, across photocell 17, the outside portion of the tape groove in tape pillar 11, supply groove 26 with the other end extending into slot 25 and held against the hub of reel 24 by the other spring bracket 23.

Specifically, the lower section of the mechanism includes a drive motor 31, which is attached to rocker plate 2 by means of screws through motor flange 52. Rocker plate 2 is pivotally mounted with respect to frame 1 by means of rocker plate pivot bearing 15, which is mounted at its upper end to frame 1. Reduction pulley 34 is rotatably mounted on a shaft, which is secured at its upper end, to frame 1 by means of nut 53. Capstan flywheel 35 is rigidly attached to capstan 8 for imparting rotation thereto to rotate within capstan bearing 13. The drive shaft of motor 31 has pulley 32 attached thereto, with this pulley serving: (1) the normal function of imparting motion to reduction pulley 34 by means of drive belt 33 and hence to capstan fly wheel 35 and capstan 8 by means of drive belt 36 and; (2) under a different function to frictionally engage tire 28 of reel 24 and directly drive the tape reel. L-shaped solenoid linkage control plate 3 is rigidly attached to the lower end of the shaft of pivot bearing 14 by coupling 54 and is positioned below the lower edge of capstan flywheel 35 and the left-hand end of rocker plate 2. Reset solenoid 37, which is positioned below capstan flywheel 35, is mounted to the underneath side of frame 1 by means of bracket 55 and has its plunger attached to linkage control plate 3. Tape tension arm 22, which has tension arm roller 10 attached to one end, is pivotally mounted at the other end to frame 1 by means of post 57, in line with and behind motor pulley 32 (FIG. 3) and is biased against tape 41 by spring 40, whereby tension arm roller 10 takes up all slack in tape 41 during operation of the machine. A trapezoidal opening 30 is provided in the left-hand end of rocker plate 2, with roller 29 rotatably attached to linkage control plate 3 and extending upward therefrom into opening 30. It will be noted that the biasing action of spring 38 on pressure roller arm 6, which is rigidly attached to the upper end of the shaft of pivot bearing 14, and of spring 39 attached to rocker plate 2, thereby maintains roller 29 in engagement with side 56 of trapezoidal opening 30.

Figure 5:
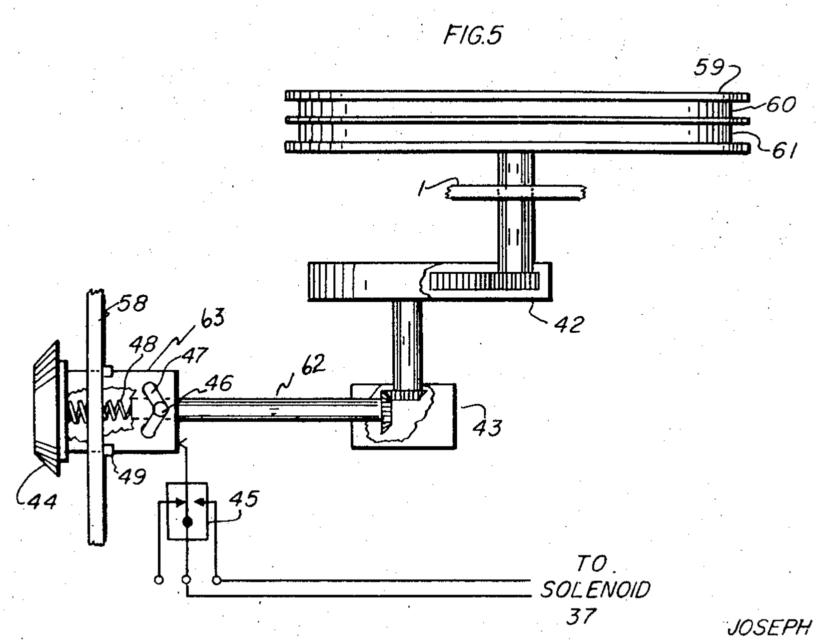
FIG. 5 is a simplified elevation view of a modification of the tape transport mechanism of FIG. 1 incorporating an indexing knob connected to the tape storage reel by means of a geared up transmission.

Referring in particular to FIG. 5, which shows the modification to the transport mechanism disclosed in FIGS. 1–4, it will be appreciated that only the apparatus relating to the manual indexing operation in either a fast forward or fast rewind direction of tape movement is shown. Tape storage reel 59, which is rotatably mounted to frame 1, is similar to storage reel 24, with the exception that it does not include a third groove having the rubber tire such as 28 embedded therein. The shaft of reel 59 is connected to the spur type gear train 42, which in turn is connected to the bevel type gear train 43. Shaft 62 is connected at one end as a normal input to bevel gear train 43, with indexing knob 44 mounted in frame 58 and its chamber 63 accommodating the other end of shaft 62. Indexing knob 44 is held in frame 58 by means of collar 49 to allow limited movement of knob 44 and chamber 63 in a longitudinal direction parallel with the axis of shaft 62. A V-shaped slot 47 is provided in chamber 63, with pin 46 securely positioned in a radial hole in shaft 62 and projecting outward therefrom into slot 47. Compression spring 48 is located inside chamber 62 and exerts a sufficient amount of force against the end of shaft 62 and knob 44, whereby pin 46 normally is positioned in the apex of V-shaped slot 47. Switch 45 is located in such a manner that its actuator arm rests against the end of chamber 63, whereby longitudinal movement of chamber 63 on shaft 62 will cause the actuator to close the normally open contacts of switch 45 to perform a later-described function.

*Operational description*

Figure 4:
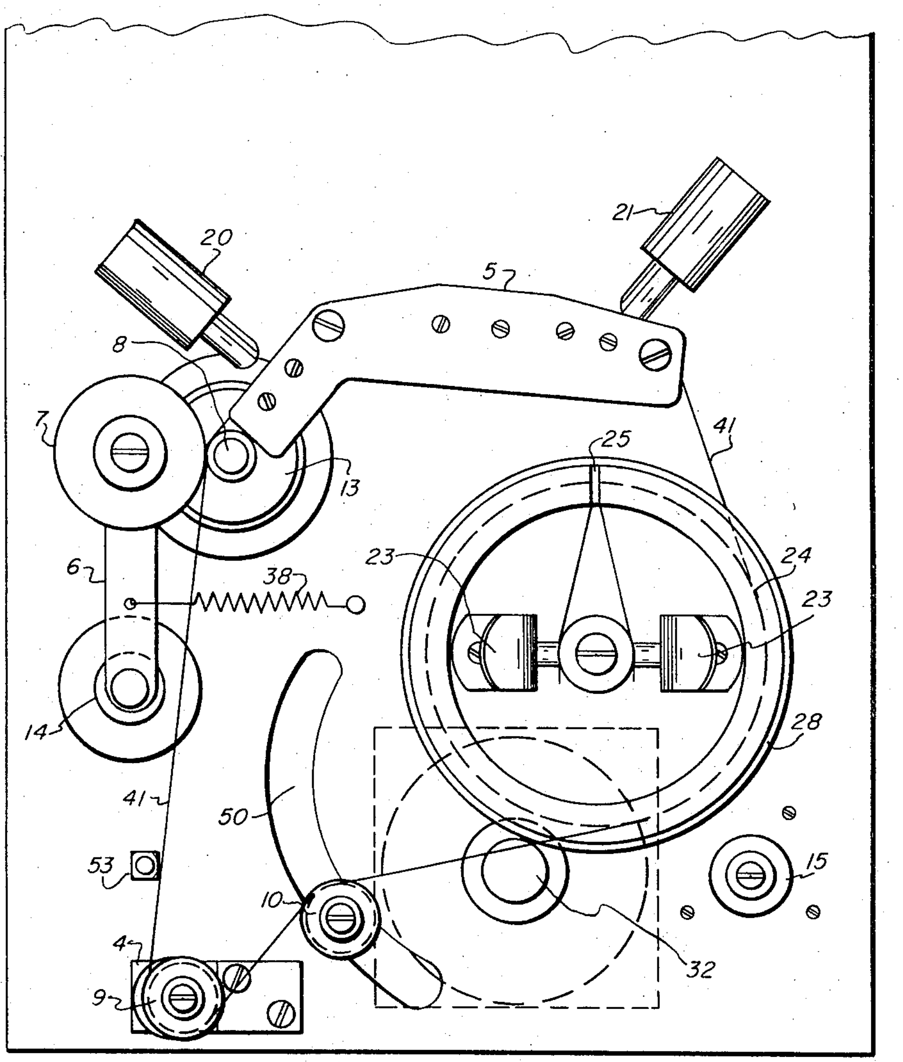
FIG. 4 is a plan view of the tape transport mechanism as viewed from the top of FIG. 3.

An operational description of the invention as disclosed in the preferred form will now be given, reference being had with FIGS. 1–4 inclusive, with it being assumed that the transport mechanism will first be operated in either the record or play function. It will be appreciated that the operating circuits of motor 31 and solenoid 37 do not constitute a part of this invention, whereby they may be arranged in any well-known manner, with it believed unnecessary to disclose them in the drawings. It will also be assumed that at the beginning of these functions, all of the recordable portion of tape 41 is stored in supply groove 26 of reel 24, and as such, tension arm roller 10 is moved forward in arcuate slot 50 to a position such as shown in FIG. 4. It will further be assumed that reset solenoid 37 is not energized, whereby the biasing action of spring 38 on the shaft linking pressure roller arm 6 and control plate 3 into a single unit is in a clockwise direction, thereby causing pressure roller 7 to press firmly against capstan 8 and tape 41, which is held therebetween. With motor 31 energized in a known manner to operate the transport in either of the above functions, drive pulley 32 rotates in a counterclockwise direction and by means of the speed-reducing transmission arrangement, consisting of drive pulley 32, drive belt 33, reduction pulley 34, drive belt 36 and capstan flywheel 35, capstan 8 will also rotate in a counterclockwise direction, but at a greatly reduced rate of speed. The rotation of capstan 8 in a counterclockwise direction results in the rotation of pressure roller 7 in a clockwise direction, thereby causing tape 41 to be pulled in the direction indicated by the arrows shown in FIG. 1. At the same time, the action of biasing spring 40 on tape tension arm 22 causes roller 10, mounted thereon, to exert sufficient force against tape 41 to take up any slack appearing therein during operation of the transport. As the record, or play, operation continues, it will be appreciated that tape 41 is simultaneously unwound from supply groove 26 and rewound into takeup groove 27, thereby changing the diameter of groove 27 as the tape builds up therein. As the buildup of tape in takeup groove 27 continues, tension arm roller 10 moves away from the original position, shown in FIG. 4, in arcuate slot 50 toward the opposite end of the slot, such as shown in FIG. 1. At this point in the movement of roller 10, approximately half of tape 41 has been unwound from supply groove 26 and rewound in takeup groove 27. This operation continues until all of tape 41 is stored in groove 27, at which time, tension arm roller 10 will have returned to its original position in slot 50. As the last portion of tape 41 leaves supply groove 26, a clear section in the end of the tape is pulled between the lamp holder 21 and photocell 17, which causes photocell 17 to operate and either (1); open the operating circuit to motor 31 to stop further operation of the transport in the record or play function or (2); complete a circuit to operate reset solenoid 37, while allowing motor 31 to remain energized, thereby causing the transport to automatically commence the rewind function such as described hereafter.

In order for the transport to automatically go into the rewind function from either the record, or play operation, it will be appreciated that it is operating as described above, with tape 41 being wound into takeup groove 27 from supply groove 26. As the clear section in tape 41 leaves supply groove 26 to cause the operation of photocell 17 for completing an energizing circuit to solenoid 37, its plunger, which is attached to control plate 3, is attracted inward, thereby moving linkage control plate 3 and causing it to pivot and turn its shaft in a counterclockwise direction within bearing 14. Since pressure roller arm 6 is rigidly attached to the shaft of control plate 3, the above-mentioned counterclockwise rotation thereof will cause arm 6 to swing outward to the left, thereby disengaging pressure roller 7 from captan 8 as shown in FIG. 4. This disengaging of pressure roller 7 from capstan 8 immediately stops all movement of tape 41 as caused by the combined rotation of capstan 8 and roller 7. It will be appreciated that as control plate 3 and its shaft is rotated, the lower arm of plate 3, having roller 29 rotatably attached thereto, moves to the right. Since motor rocker plate 2 is pivoted at bearing 15 and the biasing action of spring 39 causes side 56 of trapezoidal opening 30 to remain engaged with roller 29 as it moves to the right, rocker plate 2 will turn in a clockwise direction and roller 29 will assume a new position downward along side 56 toward the short end of opening 30. Thus, it will be seen, also as disclosed in FIG. 4, that the pivotal movement of plate 2 in a clockwise direction moved motor 31 inward toward reel 24, whereby motor drive pulley 32 is frictionally engaged with reel tire 28. Reel 24 is thereafter directly driven by motor 31 in a fast rewind operation. When all of tape 41 has been rewound on supply groove 26 from takeup groove 27, a clear section in this end of the tape causes the lamp associated with lamp holder 20 to operate photocell 16, which opens the operating circuits (not shown) to both motor 31 and solenoid 37 to stop further operation in the rewind function.

If automatic operation of the transport into the rewind function is not desired at the end of the record and play functions, the circuits may be arranged in such a manner that the appearance of the clear section in the end of tape 41 causes photocell 17 to operate and only deenergize motor 31, thereby bringing the machine to a stop. A switch (not shown) may be provided, which upon subsequent operation will complete energizing circuits to solenoid 37 and motor 31 for operating the transport in the fast rewind function in the same manner as previously described.

An operational description of the transport as modified in accordance with the disclosure of FIG. 5, will now be given, wherein the operation in either the record or play functions is the same as that described for the preferred form of machine shown in FIGS. 1–4.

It will be assumed that the transport includes all of the apparatus of the preferred disclosure, with the exception that the modification includes a unitary tape reel 59 having just the supply groove 60 and takeup groove 61 provided in its circumference. The groove containing the reel tire such as 28 is not required and motor 31 need not be pivotally mounted. Knob 44, gear train 43 and gear train 42 are provided for manual indexing of the tape in either a fast forward or fast rewind function, as will be described hereafter. It will be assumed that the transport has been operated in the record function in the same manner as described in the description for the preferred form of mechanism up to and including the point wherein the appearance of the clear section in the end of tape 41 has caused the operation of photocell 17, with the subsequent operation thereof, causing the deenergization of motor 31 to thus bring the transport to a stop. At this point, it will be assumed that the modified transport will be operated in the fast rewind function to rewind the tape 41 from storage groove 61 onto supply groove 60. Indexing knob 44 is therefore depressed inward, causing chamber 63 to move to the right in a longitudinal direction on shaft 62, whereby pin 46 will move upward into either one of the legs of V-shaped slot 47. Spring 48 will be compressed, and the actuator arm of switch 45 will be moved to the right, thereby closing the normally open contacts of switch 45 to complete a circuit for energizing solenoid 37. The operation of solenoid 37 is the same as that previously described, wherein linkage control plate 3 is caused to turn itself in a counterclockwise direction within pivot bearing 14, and pressure roller arm 6 is also caused to swing outward, away from capstan 8, to disengage pressure roller 7 therefrom. With index knob 44 being held in and turned in a clockwise direction, this movement is transferred directly to reel 59, with the gearing of spur gear train 42 being such that the speed of reel 59 is greatly increased with respect to that of indexing knob 44. Tape 41 is thereby transferred from takeup groove 61 to supply groove 60 by means of only a few revolutions of indexing knob 44. In response to the manual release of knob 44, compression spring 48 restores it to its normal position, with pin 46 being again normally positioned in the apex of V-shaped slot 47, and the actuator arm of switch 45 returning to normal to open the circuit to solenoid 37. The transport may now be operated in the previously described play function to play back messages recorded on tape 41. If it is desired to play back a particularly recorded portion located elsewhere in the tape, the tape may be advanced to this location merely by depressing index knob 44 to cause the previously described operations, and turning the knob in a counterclockwise direction, to advance the tape in a fast forward direction until the desired position in the tape is reached.

Having described our invention, what is considered new and is desired to have protected by Letters Patent, will be pointed out in the appended claims.

What is claimed is:

1. In a tape transport mechanism adapted for use with variable message recording and repeating machines; a support; a unitary tape storage reel having a pair of adjacently positioned tape storage grooves formed in the periphery thereof mounted on said support for rotation about its axis; a length of tape secured at one end and normally stored in one of said storage grooves and extending over a loop through said mechanism, and secured at the other end in the other storage groove; means operative to rotate said storage reel about its axis to transfer said tape from said one groove to said other groove by way of said loop; and compensating means mounted on said support and engaging said tape at a point in said loop for preventing slack in said loop resulting from the varying difference between the effective diameters of said pair of grooves caused by tape build-up therein during transfer of said tape from said one storage groove to the other.

2. Apparatus in accordance with claim 1, further including a manually rotatable indexing knob, and wherein said means for rotating said storage reel includes a speed-increasing gear train having input and output shafts directly connected to said indexing knob and to said storage reel, respectively, whereby manual rotation of said knob is operative to rotate said storage reel for transfer of said tape.

3. Apparatus in accordance with claim 1, wherein said compensating means includes an arm pivotally mounted at one end on said support and having a tape engaging roller rotatably mounted at the other end; and means coacting with said pivotal mounting for biasing said arm to urge said roller into engagement with said tape.

4. In a tape transport mechanism adapted for use with variable message recording and repeating machines; a support; a unitary tape storage reel mounted on said support for rotation about its axis and including a pair of adjacently positioned tape storage grooves formed in the peripheral circumference thereof; a length of tape secured at one end and normally stored in one of said storage grooves and secured at the other end in the other of said grooves; guiding means for directing said tape from said one storage groove over a loop through said mechanism to the other of said grooves; moving means operative to rotate said reel about its axis for transferring said tape from said one storage groove to said other groove by way of said loop and said guiding means; and means mounted on said support continually biased against said tape for taking up slack in said loop resulting from the varying difference between the effective diameters of said pair of grooves caused by tape build-up therein during transfer of said tape from said one storage groove to said other.

5. Apparatus in accordance with claim 4, wherein said moving means includes a capstan rotatably mounted on said support adjacent to one side of said tape in said loop; a rotatable pressure roller pivotally mounted on said support adjacent to the other side of said tape in said loop and biased against said capstan, by means of said pivotal mounting, for frictionally engaging both said capstan and said tape located therebetween; a speed-reducing transmission arrangement connected to said capstan; and a drive motor, connected to said transmission arrangement, operative to rotate said capstan by means of said transmission arrangement; whereby said frictionally engaged pressure roller is simultaneously rotated and said tape is moved to effect said transfer.

6. In a tape transport mechanism adapted for use with variable message recording and repeating machines; a support; a unitary tape storage reel mounted on said support for rotation about its axis and including a pair of adjacently positioned tape storage grooves formed in the peripheral circumference thereof; a length of tape secured at one end and normally stored in one of said grooves and secured at the other end in the other of said grooves; guide means for directing said tape in said mechanism over a loop extending between said pair of grooves; a motor having a drive shaft; tape moving means normally engaging said tape in said loop, connected to said motor by means of said drive shaft and operative thereby, for transferring said tape from said one storage groove to said other groove by way of said loop and said guide means; a third groove formed in said peripheral circumference of said storage reel; a rubber tire embedded in said third groove; and means for sequentially disengaging said tape moving means from said tape and engaging said motor drive shaft with said rubber tire to directly rotate said storage reel to rewind said tape onto said one groove to said other.

7. Apparatus in accordance with claim 6, including compensating means mounted on said support and engaging said tape at a point in said loop for taking up slack appearing in said loop resulting from the varying difference between the effective diameters of said pair of grooves caused by tape build-up therein during transfer of said tape from said one groove to said other, and said rewind of said tape onto said one groove from said other.

8. In a tape transport mechanism adapted for use with variable message recording and repeating machines; a support; a unitary tape storage reel mounted on said support for rotation about its axis and including a pair of adjacently positioned tape storage grooves formed in the periphery thereof; a length of tape secured at one end and normally stored in one of said grooves and secured at the other end in the other of said grooves; guide means for directing said tape in said mechanism over a loop extending between said pair of grooves; a capstan mounted on said support adjacent to one side of said tape in said loop; a rotatable pressure roller; a pivotal pressure roller mounting for positioning said roller adjacent the other side of said tape in said loop; means for biasing said roller adjacent said capstan by means of said pivotal mounting to frictionally cooperate with said capstan and engage said tape located therebetween; a speed-reducing transmission arrangement connected to said capstan; a motor having a drive shaft pulley connected to said transmission arrangement and operative to drive said capstan and said frictionally engaged roller to move said tape for transfer thereof from said one storage groove to said other; a mount for said motor pivotally attached at one end to said support; stop means rigidly secured to said pivotal mounting of said pressure roller and engaging the other end of said motor mount; means for biasing said motor mount against said stop means; a third groove formed in said periphery of said storage reel; a rubber tire embedded in said third groove; means for only partially rotating said pressure roller mounting in said pivotal mounting to move both said pressure roller and said stop means in sequence; said movement of said pressure roller disengaging said roller from said capstan, and said movement of said stop means freeing said motor mount for pivotal movement by said biasing means to engage said motor pulley with said rubber tire; whereby said storage reel is directly rotated by said motor to rewind said tape onto said one groove from said other.

9. Apparatus in accordance with claim 8, including means continually biased against said tape for taking up slack in said loop, resulting from the varying difference between the effective diameters of said pair of grooves caused by tape build-up therein during both said transfer of said tape from said one groove to said other and said rewind of said tape onto said one groove from said other.

References Cited

UNITED STATES PATENTS

| | | | |
|---|---|---|---|
| 2,761,899 | 9/1956 | Keith | 179—6 |
| 2,819,940 | 1/1958 | Sorrells | 346—74 |
| 2,937,816 | 5/1960 | Wood | 242—55.12 |

LEONARD D. CHRISTIAN, *Primary Examiner.*